US012742430B2

(12) United States Patent
Zhang et al.

(10) Patent No.: US 12,742,430 B2
(45) Date of Patent: Sep. 22, 2026

(54) METHOD TO ENHANCE THE PERFORMANCE OF A HEAVY-DUTY DIESEL-$H_2$ DUAL-FUEL ENGINE THROUGH ENGINE SYSTEM OPTIMIZATION

(71) Applicant: SAUDI ARABIAN OIL COMPANY, Dhahran (SA)

(72) Inventors: Yu Zhang, Novi, MI (US); Praveen Kumar, New Hudson, MI (US); Anqi Zhang, Canton, MI (US); Nayan Engineer, Canton, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 141 days.

(21) Appl. No.: 18/917,193

(22) Filed: Oct. 16, 2024

(65) Prior Publication Data

US 2025/0035057 A1 Jan. 30, 2025

Related U.S. Application Data

(62) Division of application No. 18/338,650, filed on Jun. 21, 2023, now Pat. No. 12,152,547.

(51) Int. Cl.
*F02D 41/00* (2006.01)
*F02D 41/06* (2006.01)

(52) U.S. Cl.
CPC ....... *F02D 41/0027* (2013.01); *F02D 41/068* (2013.01); *F02D 2200/021* (2013.01); *F02D 2200/023* (2013.01); *F02D 2200/0611* (2013.01)

(58) Field of Classification Search
CPC ...... F02D 19/10; F02D 19/0644; F02D 19/08; F02D 19/081; F02D 19/0615; F02D 19/102; F02D 19/0611; F02D 19/3094; F02D 41/064; F02D 41/0027; F02D 2200/021; F02D 2200/023; F02P 19/02; Y02T 10/30
See application file for complete search history.

(56) References Cited

U.S. PATENT DOCUMENTS

| | | | | |
|---|---|---|---|---|
| 10,968,837 | B1 * | 4/2021 | Yeung | F02C 6/00 |
| 12,152,547 | B1 * | 11/2024 | Zhang | F02D 41/0027 |
| 2023/0184181 | A1 * | 6/2023 | Klingbeil | F02D 41/062 123/445 |
| 2023/0193810 | A1 * | 6/2023 | Klingbeil | F02B 3/08 |

* cited by examiner

*Primary Examiner* — John Kwon
(74) *Attorney, Agent, or Firm* — Osha Bergman Watanabe & Burton LLP

(57) ABSTRACT

A hydrogen-diesel dual-fuel engine that includes an engine block, where the engine block includes a cylinder outfitted with at least two hydrogen fuel injectors and a piston. The engine further includes an air-handling system that includes an intake manifold, an intake pipe, an exhaust pipe, a variable geometry turbocharger, and an exhaust gas recirculation system configured to recirculate exhaust gases from the exhaust pipe to the intake manifold. The engine further includes a two-step camshaft, where the two-step camshaft is configured with the air-handling system for exhaust rebreathing and late intake valve closing, and a port fuel injector system that provides hydrogen gas to the at least two hydrogen fuel injectors. The engine further includes a diesel injector, a common-rail fuel injection system, a plurality of sensors, and a controller configured to receive engine data from the plurality of sensors and to control operation of the hydrogen-diesel dual-fuel engine.

21 Claims, 10 Drawing Sheets

METHOD TO ENHANCE THE PERFORMANCE OF A HEAVY-DUTY DIESEL-$H_2$ DUAL-FUEL ENGINE THROUGH ENGINE SYSTEM OPTIMIZATION

This Application is a Division of application Ser. No. 18/338,650 filed on Jun. 21, 2023. The entire contents of these applications are incorporated herein by reference in their entirety.

BACKGROUND

Diesel engines are widely used for power generation and transportation. In recent years, attempts have been made to reduce emissions of diesel engines by, among other things, introducing hydrogen as an additional fuel into the engine. In theory, hydrogen is a promising candidate to supplant some diesel use due to its carbonless chemical structure. Further, in many instances, hydrogen can be directly supplied to existing internal combustion (IC) engine architectures.

However, hydrogen-diesel engines are associated with many issues. In particular, current hydrogen injection strategies do not allow for cylinder-based fueling control and do not work well in transient operation. Additionally, in practice, hydrogen-diesel engines have slower combustion than mixing-controlled diesel combustion resulting in decreased engine efficiency and higher combustion losses. Thus, current hydrogen-diesel engines exhibit diminished fuel efficiency and $CO_2$ reduction potential and only operate over truncated ranges.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a hydrogen-diesel dual-fuel engine. The hydrogen-diesel dual-fuel engine includes an engine block. The engine block includes a cylinder, where the cylinder is outfitted with at least two hydrogen fuel injectors and a piston, where the piston is enclosed by the cylinder and wherein the piston includes a piston crown. The hydrogen-diesel dual-fuel engine further includes an air-handling system. The air-handling system includes an intake manifold, an intake pipe, where the intake pipe receives air through an air inlet and carries the air to the intake manifold, and an exhaust pipe, where the exhaust pipe receives exhaust gases and expels, at least a portion, of the exhaust gases. The air-handling system further includes a variable geometry turbocharger coupled to the intake pipe and the exhaust pipe, and an exhaust gas recirculation system configured to recirculate exhaust gases from the exhaust pipe to the intake manifold. The hydrogen-diesel dual-fuel engine further includes a two-step camshaft, where the two-step camshaft is configured with the air-handling system for exhaust re-breathing and late intake valve closing and a port fuel injector system directly integrated with the intake manifold, where the port fuel injector system provides hydrogen gas to the at least two hydrogen fuel injectors. The hydrogen-diesel dual-fuel engine further includes a diesel injector configured to inject diesel into the cylinder, a common-rail fuel injection system configured to supply diesel to the diesel injector, a plurality of sensors, and a controller. The plurality of sensors includes a temperature sensor and a tachometer. The controller is configured to receive engine data from the plurality of sensors and to control operation of the hydrogen-diesel dual-fuel engine.

Embodiments disclosed herein generally relate to a method of operating a hydrogen-diesel dual-fuel engine at warm conditions. The method includes determining an operational load of the hydrogen-diesel dual-fuel engine, determining a plurality of hydrogen-diesel dual-fuel engine parameters based on the operational load, and adjusting the plurality of hydrogen-diesel dual-fuel engine parameters. The plurality of hydrogen-diesel dual-fuel engine parameters includes a hydrogen energy parameter, an equivalence ratio parameter, an exhaust gas recirculation parameter, a first diesel injection event timing parameter, a second diesel injection event timing parameter, a first diesel injection quantity parameter, an exhaust re-breathing parameter, and a late intake valve closing parameter.

Embodiments disclosed herein generally relate to a method of operating a hydrogen-diesel dual-fuel engine. The method includes determining an ambient temperature, where the ambient temperature is the temperature of an environment surrounding the hydrogen-diesel dual-fuel engine, determining a coolant temperature, where the coolant temperature is the temperature of a coolant in the hydrogen-diesel dual-fuel engine, and determining an oil temperature, where the oil temperature is the temperature of an oil in the hydrogen-diesel dual-fuel engine. The method further includes receiving a target temperature, and determining, based on the ambient temperature, coolant temperature, and oil temperature, and the target temperature, a state of the hydrogen-diesel dual-fuel engine. The method further includes selecting an operation method, based on, at least, the state of the hydrogen-diesel dual-fuel engine.

Other aspects and advantages of the claimed subject matter will be apparent from the following description and the appended claims.

DETAILED DESCRIPTION

Figure 1:
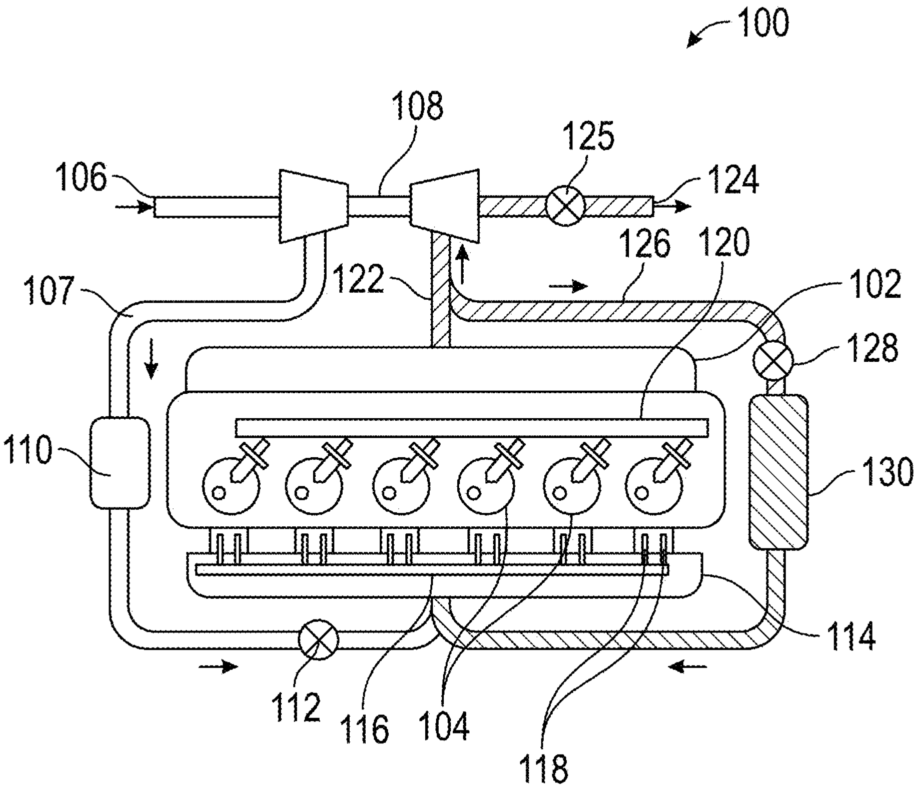
FIG. 1 depicts a hydrogen-diesel dual-fuel engine, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-10, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Diesel engines are widely used for power generation and transportation. Generally, diesel engines are efficient with respect to energy extraction, but often have relatively high $NO_x$ output (oxides of nitrogen) and soot emissions. To operate diesel engines while reducing pollutants, recent advancements have been made with emission aftertreatment systems such as diesel particulate filters (DPFs) and lean $NO_x$ traps (LNTs). However, these systems are often costly and may decrease the fuel efficiency of the engine by increasing fuel consumption. Accordingly, there exists a need to develop engine-side technologies, such as in-cylinder combustion strategies and engine operating methods, to simultaneously increase engine efficiency while reducing undesired and noxious combustion products.

The complexity of combustion-based engines, such as diesel engines, cannot be understated. Under equilibrium conditions, understanding the energy released during combustion, the temperature and species of the products, and the power output of a thermodynamic device is a relatively straightforward process. This process involves comparing the enthalpies of formation of the reactants and products and minimizing Gibbs free energy (i.e., maximizing entropy). However, due, in part, to the short residence times of combustion in an engine, equilibrium-based techniques are poor predictors of engine output and performance. In contrast, to understand combustion in an engine, items such as the distribution of reactants, diffusion of species, chemical kinetics, ignition timings, etc. must be considered. The combustion processes in an engine are coupled with, at least, fluid dynamics (e.g., turbulence) and the local and global temperatures of the combustion chamber (cylinder). In fact, thermodynamic properties such as specific heats, and reaction rates, are strong functions of temperature, further complicating the analysis of an engine.

Due to the complex interactions of the combustion processes and environment in a combustion engine, there exists a complicated tradeoff space between desired engine features. As stated, desired diesel engine features include, but are not limited to, increased engine efficiency and reduction of harmful exhaust products and soot. For example, generally, engine efficiency, or the amount of energy that can be converted to useful mechanical work relative to the amount of available energy, is increased as the temperature of the combustion products is increased. However, high combustion chamber temperatures produce higher concentrations of harmful species such as $NO_x$ in the exhaust products.

Due to its carbonless chemical structure, hydrogen ($H_2$) has drawn increasing attention in the commercial transport sector for carbon dioxide ($CO_2$) reduction. Compared to hydrogen fuel cells, hydrogen-fueled internal combustion engines ($H_2$-ICE) are less expensive and less complex as they do not require precious metals and can take advantage of the existing internal combustion (IC) engine architectures and components. In addition, IC engines do not require high purity hydrogen.

Further, while hydrogen has high flame speed and low minimum ignition energy, it requires high pressure and temperature for autoignition. The research octane number (RON) for hydrogen is greater than 130. Consequently, to be used as a fuel in an IC engine, hydrogen needs to be combined with a robust ignition source for compression ignition operation.

Thus, with a stated goal of engine-side technologies that increase diesel engine performance while simultaneously reducing emissions, a dual-fuel engine using hydrogen and diesel has been proposed. This is because, intuitively, at least from an equilibrium perspective, $CO_2$ emissions are reduced as more hydrogen is introduced into the engine (replacing diesel). However, in practice, hydrogen-diesel dual-fuel engines have not been found to be without issues. For example, at low loads, dual-fuel operation incurs high combustion losses and hydrogen slip in the exhaust due to the low autoignition propensity of hydrogen. On the other hand, for high load operation, the hydrogen energy input is limited due to concerns of pre-ignition, excessive pressure rise rate, and knock. These issues have severely constrained the operation range of proposed hydrogen-diesel dual-fuel engines.

Further, hydrogen-diesel dual-fuel engines have been realized primarily by introducing hydrogen to an existing diesel engine through upstream intake fumigation. However, upstream intake fumigation does not allow for precise cylinder-based fueling control (i.e., in-cylinder combustion strategies) and transient operation. Consequently, due to a lack of tailored combustion and air-handling development, the fuel efficiency of hydrogen-diesel combustion is typically lower than mixing-controlled diesel combustion. The decreased efficiency is mostly attributed to slower combustion and higher combustion losses. Thus, current hydrogen-diesel dual-fuel engines exhibit diminished fuel efficiency and $CO_2$ reduction potential and only operate over a truncated operational range.

In one aspect, embodiments disclosed herein relate to a hydrogen-diesel dual-fuel engine system and method of operation that overcomes the aforementioned issues. The hydrogen-diesel dual-fuel engine system and method of operation disclosed herein maximizes engine efficiency while reducing emissions and maintaining $NO_x$ levels below state-of-the-art thresholds over a full range of operating conditions (i.e., from cold startup to heavy load conditions). This is accomplished, in part, through a tailored fuel injection strategy coordinated with a custom piston crown geometry and a load-dependent air-handling strategy.

In accordance with one or more embodiments, FIG. 1 provides an overview of the hydrogen-diesel dual-fuel engine (100). It is noted that not all components of the hydrogen-diesel dual-fuel engine (100) are depicted in FIG. 1. However, one with ordinary skill the art will recognize that the depictions and associated descriptions of the select components shown are sufficient to provide requisite context and to distinguish unique features. As such, the fact that not all components of the hydrogen-diesel dual-fuel engine (100) are depicted in FIG. 1 does not impose a limitation on the instant disclosure.

The hydrogen-diesel dual-fuel engine (100) has a geometric compression ratio (CR) of 16 or higher. The hydrogen-diesel dual-fuel engine (100) is composed of an engine block (102) which houses one or more cylinders (104) and pistons. The hydrogen-diesel dual-fuel engine (100) depicted in FIG. 1 has six cylinders (104). To prevent cluttering FIG. 1, not every cylinder (104) is labelled. Air is received by the hydrogen-diesel dual-fuel engine (100) through an air inlet (106) and travels to the engine block (102) by an intake pipe (107). In one or more embodiments, the intake pipe (107) is coupled to a single-stage variable geometry turbocharger (VGT) (108) to compress the air received from the air inlet (106) before travelling to the engine block (102). The VGT (108) has variable nozzles incorporated on the turbine. Before travelling to the engine block (102), the air, through the intake pipe (107), travels through a charge air cooler (110) and idle air control valve (112) and is received by an intake manifold (114). Typically, the VGT (108) will increase the temperature of the incoming air. If not controlled, it is possible that the temperature of the reactants will become excessive. Excessive reactant temperatures can lead to reduced charge density and higher combustion temperatures which can affect torque, power, and emissions. The charge air cooler (110) cools the intake air before entering the cylinder (104). The idle air control valve (112) regulates airflow to the engine to ensure smooth idling.

Hydrogen is introduced to the hydrogen-diesel dual-fuel engine (100) through a multi-point, port fuel injector system (116) integrated directly into the intake manifold (114). The port fuel injector system (116) is composed of hydrogen fuel injectors (118). Again, to prevent cluttering FIG. 1, not all hydrogen fuel injectors (118) are labelled. In accordance with one or more embodiments, there are two hydrogen fuel injectors (118) for each cylinder (104) and the hydrogen fuel injectors operate with 5-7 bar pressure differential across the injectors. Thus, the intake manifold (114) and the port fuel injector system (116) can provide a precisely controlled mixture of hydrogen and air to each cylinder (104). The amount of hydrogen injected into each cylinder (104) may vary depending on the operating load and condition of the hydrogen-diesel dual-fuel engine (100).

Diesel is injected directly into cylinders (104) of the hydrogen-diesel dual-fuel engine (100) through a high-pressure common-rail fuel injection system (120). Typically, the diesel fuel is pressurized in the common-rail fuel injection system (120) to a pressure greater than or equal to 2200 bar.

After combustion, exhaust products exit the hydrogen-diesel dual-fuel engine (100) using an exhaust pipe (122). The exhaust pipe (122) is coupled to the VGT (108). The exhaust products may be expelled to the environment, or other external device, via the exhaust outlet (124) after passing through an exhaust back pressure valve (125). The exhaust back pressure valve (125) is a variable position valve that controls exhaust back pressure, typically, during cold ambient temperatures. The exhaust pipe (122) is also connected to a high-pressure exhaust gas recirculation system (126). The exhaust gas recirculation system (126) allows for exhaust gas to be recirculated back to the intake manifold (114) where the exhaust gases may be mixed with incoming air to the hydrogen-diesel dual-fuel engine (100). The exhaust gas recirculation system (126) includes an exhaust gas recirculation valve (128) and an exhaust gas recirculation cooler (130). The exhaust gas recirculation cooler (130) provides a similar function to the charge air cooler (110). Simply, the exhaust gas recirculation cooler (130) cools the exhaust being recirculated back to the cylinders (104). Typically, the exhaust gas recirculation cooler (130) uses the engine coolant (not shown) to cool the recirculated exhaust reducing its volume and increasing its density before the exhaust is combined with the intake air to reduce combustion temperatures and subsequently mitigate $NO_x$ formation.

The intake pipe (107), charge air cooler (110), idle air control valve (112), VGT (108), exhaust pipe (122), exhaust gas recirculation system (126), and intake manifold (114) collectively make up the air handling system of the hydrogen-diesel dual-fuel engine (100). The VGT (108) and the exhaust gas recirculation system (126) are designed to maintain the production of $NO_x$ below 1-2 g/kWh with low pumping losses. Specifically, the VGT (108) housing and wheels are customized along with low restriction piping used in the exhaust gas recirculation system (126) to deliver an equivalence ratio and quantity of exhaust gas specified by methods of operating the hydrogen-diesel dual-fuel engine (100) detailed later in the instant disclosure. As will be shown, in accordance with one or more embodiments, as the operational load of the hydrogen-diesel dual-fuel engine (100) increases, variable vanes in the VGT (108) are gradually closed to build sufficient boost while the exhaust back pressure valve (125) initially opens up and then gradually closes. In conjunction with existing emission aftertreatment devices it is expected that the hydrogen-diesel dual-fuel engine (100) will meet the future ultra-low $NO_x$ threshold of 0.027 g/kWh.

In one or more embodiments, the hydrogen-diesel dual-fuel engine (100) is coupled to a controller (not shown). The controller is configured to receive measurements from a plurality of sensors disposed on the hydrogen-diesel dual-fuel engine (100) and to control the behavior of various components of the hydrogen-diesel dual-fuel engine (100). The plurality of sensos is capable of reading engine data (one or more measurements describing the state of the engine) that may be used to determine the operational load of the hydrogen-diesel dual-fuel engine (100). In one or more embodiments, the plurality of sensors includes one or more temperature sensors disposed on, or throughout, the engine, and a tachometer. For example, the temperature sensors may be disposed to measure the temperature of various fluids of the engine (e.g., oil and coolant). The controller can provide a control signal to components of the hydrogen-diesel dual-fuel engine (100) to alter their behavior according to a determined operational load of the hydrogen-diesel dual-fuel engine (100). That is, there are various controllable settings, parameters, and/or quantities associated with the hydrogen-diesel dual-fuel engine (100). For example, in accordance with one or more embodiments, the relative quantities of hydrogen and diesel used in the hydrogen-diesel dual-fuel engine (100), fuel injection timings, amount of exhaust gas recirculation used, and fuel injection pressures are adjusted by the controller according to the determined operational load. The use of the controller to alter controllable settings, parameters, and/or quantities associated with the hydrogen-diesel dual-fuel engine (100) as a function of the determined operational load of the hydrogen-diesel dual-fuel engine (100) will be discussed in greater detail later in the instant disclosure.

Figure 2A:
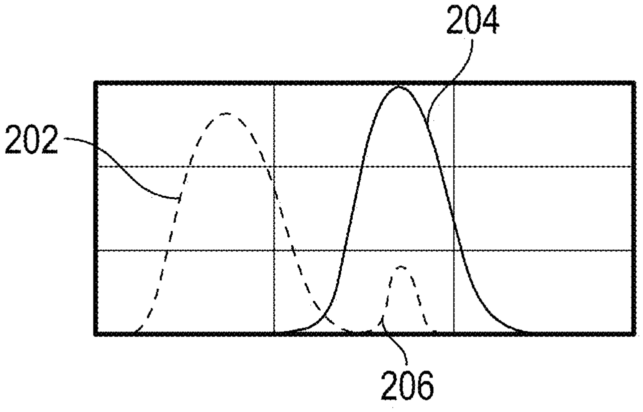
FIG. 2A depicts exhaust re-breathing, in accordance with one or more embodiments.
Figure 2B:
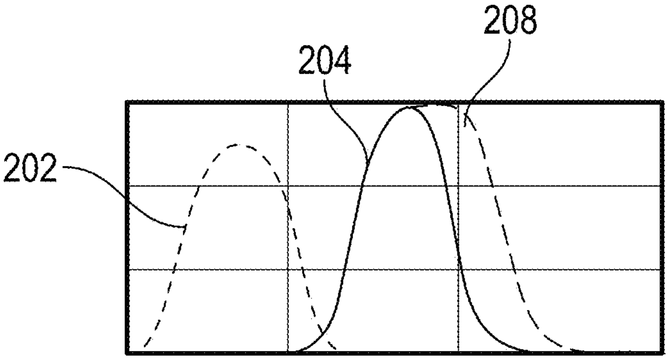
FIG. 2B depicts an air intake strategy, in accordance with one or more embodiments.

The air handling system is further configured to work with two-step camshafts (not shown) that are capable of exhaust re-breathing at low loads and late intake valve closing (LIVC) at high loads. FIGS. 2A and 2B depict the rate of exhaust and air intake at low and high loads, respectively. FIG. 2A depicts both a standard exhaust curve (202) and a standard intake curve (204) which represent the normal pattern of exhaust and intake without exhaust re-breathing or LIVC. However, at low loads, and as shown in FIG. 2A, a secondary exhaust curve (206) indicates that some of the exhaust from the hydrogen-diesel dual-fuel engine (100) is re-breathed and mixed with incoming air during intake. Likewise, FIG. 2A, which depicts the rate of exhaust and air intake under high loads, shows the standard exhaust curve (202) and the standard intake curve (202), however, the standard intake curve (202) is shown for illustration purposes only. In practice, under high loads, the hydrogen-diesel dual-fuel engine (100) engages the two-step camshafts to initiate LIVC. The rate of air intake using LIVC is demonstrated in FIG. 2B by the LIVC curve (208).

Figure 3A:
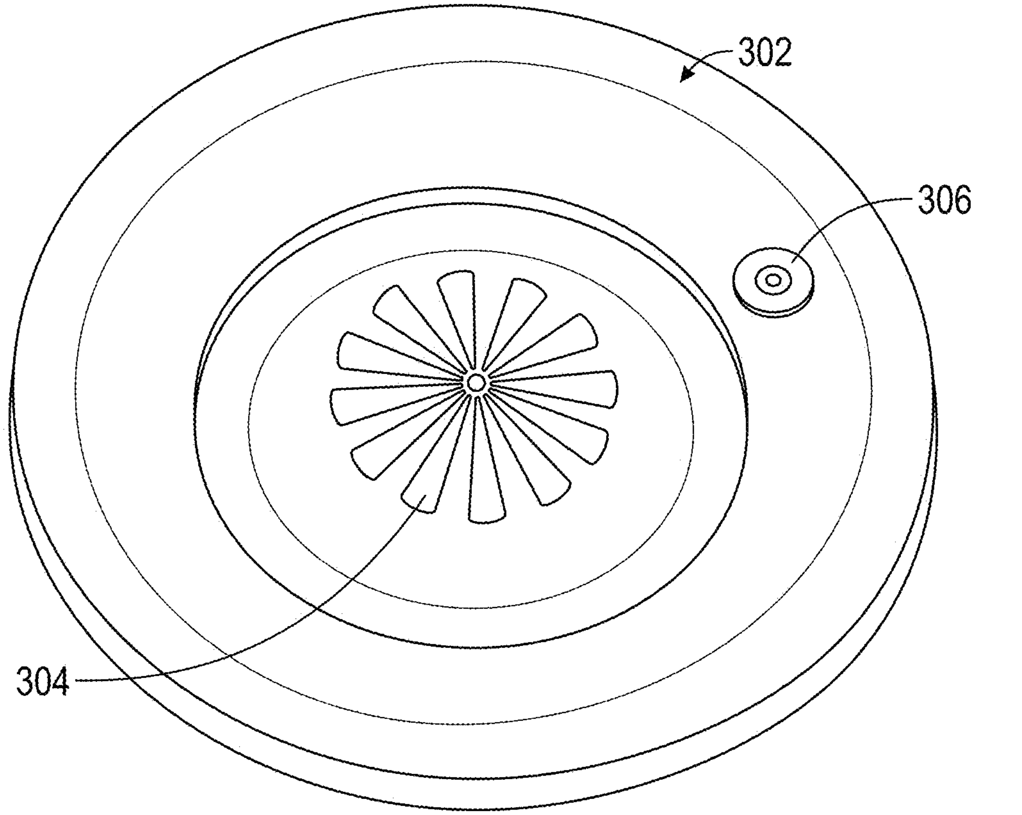
FIG. 3A depicts a piston crown, in accordance with one or more embodiments.
Figure 3B:
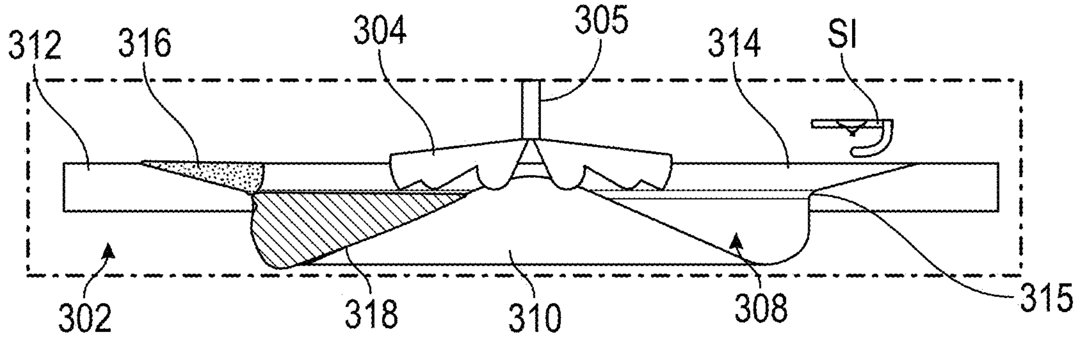
FIG. 3B depicts a section view of a piston crown, in accordance with one or more embodiments.

The cylinder and piston crown of the hydrogen-diesel dual-fuel engine (100) are designed in coordination with the thermal environment of the cylinder (104) and a multi-stage dual-fuel injection strategy to tailor the charge reactivity. In accordance with one or more embodiments, FIGS. 3A and 3B depict the geometry of the piston crown (302) and other elements proximate a cylinder (104). Specifically, FIGS. 3A and 3B depict the piston crown (302) as the piston (not shown) approaches top dead center between compression and expansion strokes (0° C. A). As seen in these figures, each cylinder (104) can receive a spray (304) of diesel from a diesel injector (305). The diesel injector (305) is composed of nozzles to produce a spray pattern. In one or more embodiments, the number of nozzles in the diesel injector is greater than or equal to 12. Each cylinder (104) is also equipped with a spark ignitor (306). The spark ignitor (306) enables the spark ignition of hydrogen. As will be explained in greater detail later in the instant disclosure, under cold start conditions the hydrogen-diesel dual-fuel engine (100) operates with a substantially stoichiometric mixture of hydrogen and air (i.e., no diesel). Thus, the spark ignitor (306) is provided to ignite this stoichiometric mixture of hydrogen and air.

FIG. 3B depicts a section view of the piston crown (302). As seen in FIG. 3B, the piston crown (302) has a piston bowl (308) which is recessed in the piston crown (302). As the piston approaches TDC between compression and expansion strokes, the piston bowl (308) effectively forms a combustion chamber. The design and shape of the piston bowl (308) directly affects the mixing and stratification of the fuel (hydrogen and diesel) and air. In one or more embodiments, the piston bowl (308) is defined by a conical center (310), a substantially flat periphery (312), and a bowl wall (314). The bowl wall (314) and the conical center (310) form and enclose a substantially annular volume. The bowl wall (314) has a curved profile with a convex radius (315). The convex radius (315) can be used as a reference to further segment the annular volume into a periphery region (316) and a central region (318). The periphery region (316) and the central region (318) are indicated with arbitrary patterns on the left-hand side of FIG. 3B, however, it is emphasized that these regions are annular and angularly extend throughout the entire piston bowl (308). The geometry of the piston bowl (308) (e.g., flat periphery (312), conical center (310), bowl wall (314) with convex radius (315)) and the large number of nozzles (≥12) on the diesel injector (305) result in a combustion chamber with low squish and zero-swirl ratio.

Figure 4A:
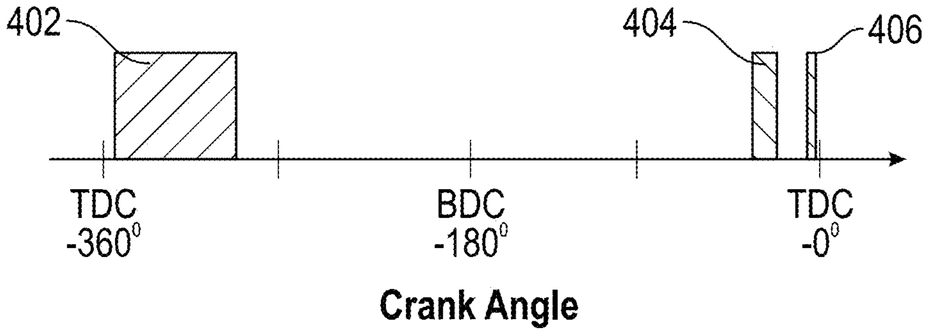
FIG. 4A depicts a fuel injection strategy at low operational loads, in accordance with one or more embodiments.
Figure 4B:
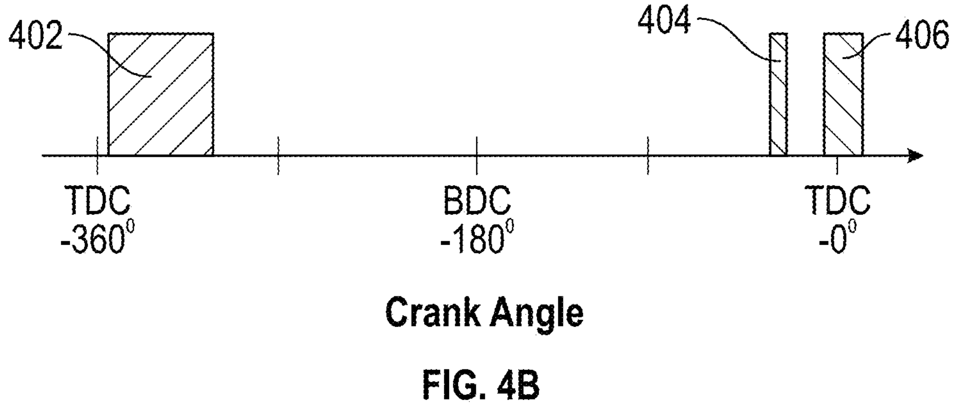
FIG. 4B depicts a fuel injection strategy at moderate operational loads, in accordance with one or more embodiments.
Figure 4C:
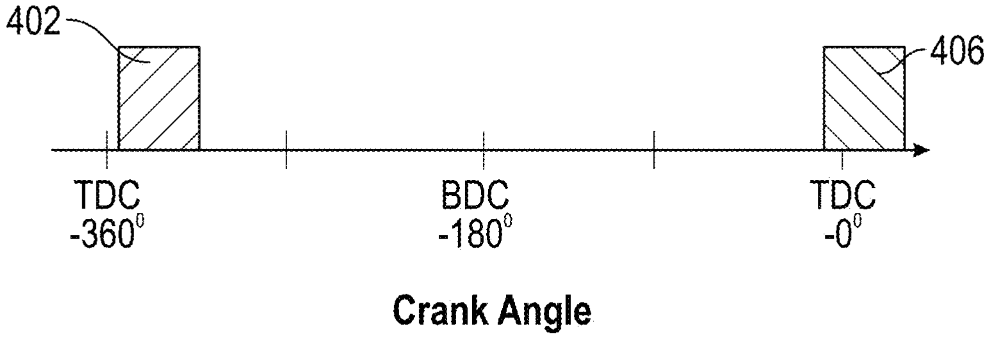
FIG. 4C depicts a fuel injections strategy at high operational loads, in accordance with one or more embodiments.

The multi-stage dual-fuel injection strategy for the hydrogen-diesel dual-fuel engine (100) is depicted in FIGS. 4A-4C. In general, with the port fuel injector (116) integrated directly into the intake manifold (114), hydrogen is injected into air as the air is introduced into the cylinder (104) during the intake stroke. Diesel is injected into the cylinder (104) later in one or two stages. As will be shown, the diesel is injected when the piston is near TDC between the compression and expansion strokes. The relative amounts of hydrogen and diesel introduced into the cylinder (104) depend on the operational load of the hydrogen-diesel dual-fuel engine (100). Further, the timing and relative amounts of diesel injected during the first and second stages, when applicable, are dependent on the operational load of the hydrogen-diesel dual-fuel engine (100). FIGS. 4A, 4B, and 4C depict the rates of hydrogen and diesel injection relative to the crank angle (CA) of the piston at low, moderate, and high loads, respectively. In general, FIGS. 4A-4C depict a hydrogen injection event (402), a first diesel injection event (404) and second diesel injection event (406). The location of the injection events (402, 404, 406) on the horizontal axes that represents the crank angle of the piston, indicate the timing of the hydrogen and diesel injections. The width of the injection events (402, 404, 406) demonstrates the relative quantity of hydrogen and diesel introduced into the cylinder (104) of the hydrogen-diesel dual-fuel engine (100).

As seen in FIG. 4A, when the hydrogen-diesel dual-fuel engine (100) is under low operational loads, hydrogen is introduced into the cylinder (104) early during the intake stroke. The first diesel injection event (404) occurs at −40° to −30° aTDC (during the compression stroke). The first diesel injection event (404) is followed by a pause as the piston crown (302) approaches TDC. Additional diesel fuel is injected into the cylinder (104) during the second diesel injection event (406) which terminates just before the piston crown (302) reaches TDC. Under low loads, more diesel is injected into the cylinder (104) during the first diesel injection event (404) than during the second diesel injection event (406) as demonstrated by the relative widths of the first diesel injection event (404) and second diesel injection event (406) bars in FIG. 4A.

As the operational load on the hydrogen-diesel dual-fuel engine (100) increases, the amount of the diesel injected into the cylinder (104) during the first diesel injection event (404) is gradually decreased relative to the amount of diesel injected during the second diesel injection event (406). This is depicted in FIG. 4B, which shows the hydrogen and diesel fuel injection strategy of the hydrogen-diesel dual-fuel engine (100) under moderate loads. The start of the first diesel injection event (404) and the second diesel injection (406) both occur before TDC. However, because more diesel is injected during the second diesel injection event (406) at moderate loads, the diesel injection continues into the expansion stroke. Further, as shown in FIG. 4B, relatively less hydrogen is provided to the hydrogen-diesel dual-fuel engine (100).

At high operational loads, the cylinder (104) charge is expected to be markedly promoted in terms of pressure and temperature. Consequently, and as depicted in FIG. 4C, the first diesel injection event (404) is completely removed to prevent overly early combustion phasing and/or an excessive pressure rise rate. That is, when the hydrogen-diesel dual-fuel engine (100) is at high operational loads, all of the diesel that is to be injected into the cylinder (104) is injected during the second diesel injection event (406). Again, as in FIG. 4B, the second diesel injection event (406) extends into the expansion stroke. Additionally, at high operational loads, less hydrogen is provided to the hydrogen-diesel dual-fuel engine (100) as depicted by the decreased width of the hydrogen injection event (402) bar in FIG. 4C. This is to reduce the portion of pre-mixed combustion so that combustion phasing, pressure rise rate, and peak cylinder pressure can be better controlled through diesel diffusion combustion.

The purpose of the piston bowl (308) geometry and the multi-stage diesel injection strategy is to maintain control over the combustion phasing and the combustion noise, and to tailor charge reactivity and reactivity stratification. The piston bowl (308) geometry, diesel injector (305), and multi-stage diesel injection strategy are further developed in close coordination with the in-cylinder thermal environment. The result is that the hydrogen-diesel dual-fuel engine (100) can efficiently operate over its full range (i.e., from cold start to high operational loads).

Figure 5A:
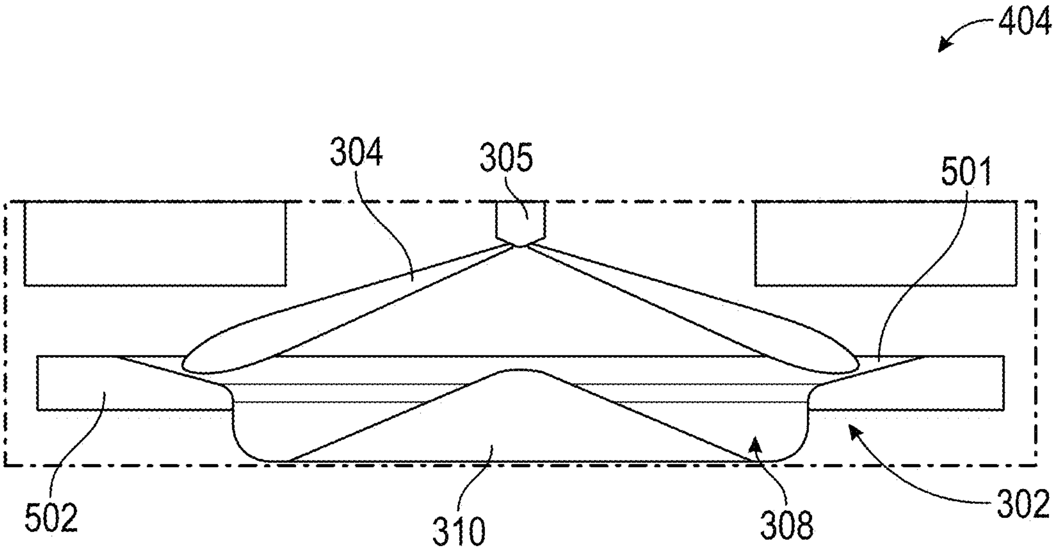
FIG. 5A depicts a first diesel fuel injection event, in accordance with one or more embodiments.
Figure 5B:
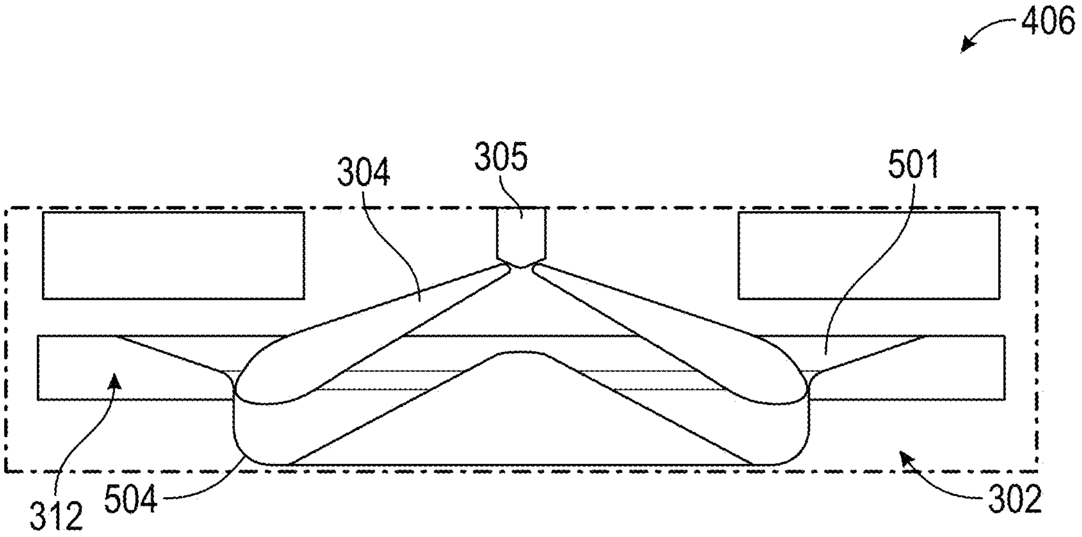
FIG. 5B depicts a second diesel fuel injection event, in accordance with one or more embodiments.

FIGS. 5A and 5B depict the relative location of the piston crown (302) during the first diesel injection event (404) and the second diesel injection event (406), respectively. As depicted in FIG. 5A, the first diesel injection event (404) is timed relative to the position of the piston crown (302) such that the diesel spray (304) contacts a ramp (501) on the piston bowl (308) where the ramp is on the periphery side of the piston crown (302) relative to the convex radius (315). The contact of the diesel spray (304) with the ramp (501) causes the diesel spray (304) to move outwardly in a mostly outward circulation path (502). The mostly outward circulation path (502) of the diesel spray (304) enhances the charge reactivity in the periphery region (316).

The second diesel injection event (406) occurs when the piston is near TDC between the compression and expansion strokes. FIG. 5B depicts that when the piston is near TDC, the diesel spray (304) contacts the convex radius (315) of the piston bowl (308) and the diesel spray (304) is projected on a mostly reverse circulation path (504). As a result of the interaction between the diesel spray (304) and the piston bowl (308), the trajectory of the diesel is reversed toward the central region (318) to improve the reactivity distribution within the piston bowl (308).

While FIGS. 4A-4C and FIGS. 5A-5B depict the fuel injection strategy of the hydrogen-diesel dual-fuel engine (100) at discrete operational loads (e.g., low, moderate, and high), one with ordinary skill in the art will appreciate the fuel injection strategy is not limited to discrete states. In accordance with one or more embodiments, the quantities of hydrogen and diesel injected into the hydrogen-diesel dual-fuel engine (100) and the timing and duration of the first diesel injection event (404) and the second diesel injection event (406) vary continuously with respect to operational load. In other words, the quantities of hydrogen and diesel and the timing of injection events may be specified with continuous-valued functions according to a continuous (or non-discrete) measure of operational load on the hydrogen-diesel dual-fuel engine (100).

To summarize, the piston crown (302) and the fuel injection strategy of the hydrogen-diesel dual-fuel engine (100) are designed to synergistically interact, while accounting for the thermal environment of the cylinder (104) to reduce combustion losses and enhance geometry-guided reactivity distribution. For example, considering the low autoignition propensity of hydrogen, typically, a lean hydrogen-air mixture forms in the squish region and is a major source for combustion losses. Therefore, the piston bowl (308) geometry is designed to reduce squish to improve the combustion efficiency. Further, the central region (318) is a known origin for incomplete combustion products. In the design disclosed above, this issue is addressed by employing a high number of nozzles (i.e., at least 12) on the diesel injector (305) to enhance the charge reactivity in the central region (318). Moreover, the convex radius (315), which essentially partitions the piston bowl (308) into two regions, provides an effective means to guide the reactivity distribution through interactions between the diesel spray (304) and the bowl wall (314). Finally, the combustion chamber formed by the piston crown (302) is intended for zero-swirl motion to retain sufficient fuel reactivity stratification. The zero-swirl motion and the fuel reactivity stratification result in robust control over the combustion process and minimizes the in-cylinder heat transfer losses.

Figure 6A:
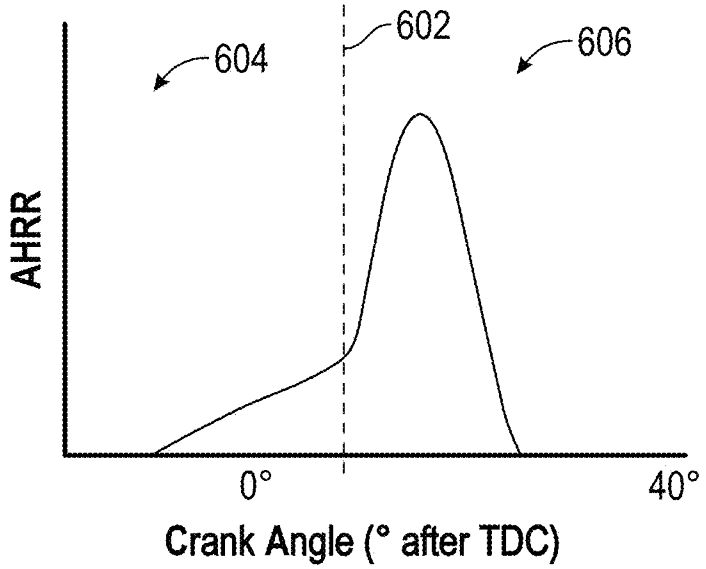
FIG. 6A depicts an apparent heat release rate at low to moderate operational loads, in accordance with one or more embodiments.
Figure 6B:
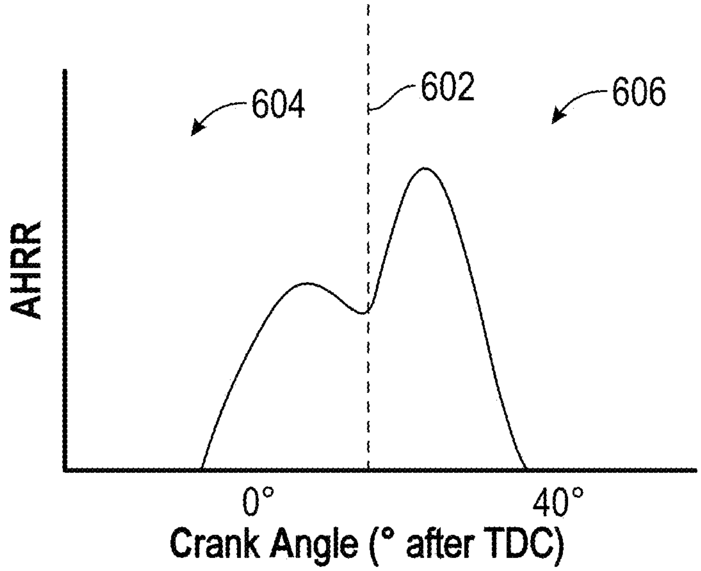
FIG. 6B depicts an apparent heat release rate hat moderate to high operational loads, in accordance with one or more embodiments.

As stated, the disclosed timing and multi-stage fuel injection strategy allow controlled charge reactivity which is tailored according to the operational load of the hydrogen-diesel dual-fuel engine (100). This has a strong effect on the amount and timing of energy released during combustion, where the released energy is realized as heat. FIGS. 6A and 6B depict the apparent heat release rate (AHRR) at low to moderate and at high operational loads, respectively. Generally, AHRR profiles are strongly tied to diesel engine performance goals such that tailoring an AHRR through designed charge reactivity, where charge reactivity is controlled as described above, is advantageous. In FIGS. 6A and 6B, the depicted AHRR profiles are partitioned into a first stage of combustion (604) and a second stage of combustion (606) by a partition line (602) (the partition line (602) is for illustration purposes only).

FIG. 6A depicts the AHRR at low to moderate operational loads. The energy released during the first stage of combustion (604) is initiated during the second diesel injection event (406) and originates from a mild phase of combustion from diesel and the entrained hydrogen. At low to moderate operational loads, the first stage of combustion (604) builds up the thermal environment which leads to and induces the second stage of combustion (606). The second stage of combustion (606) is marked by fast, partially-premixed combustion, progressing from high-reactivity regions to low-reactivity regions.

FIG. 6B depicts the AHRR at high operational loads. At high operational loads, the cylinder charge is markedly promoted in terms of pressure and temperature. Consequently, the first diesel injection event (404) is removed (see FIG. 4C) to prevent overly early combustion phasing or excessive pressure rise rate. At high operational loads, the first stage of combustion (604) is driven by the diffusion of the diesel fuel injected while the piston is near TDC and hydrogen that is entrained into the diesel spray (304). The second stage of combustion (606) is mainly composed of the combustion of the remaining hydrogen that was injected and mixed into the intake air and was distant to the diesel spray (304). This is, because diesel fuel has higher autoignition reactivity than hydrogen it will ignite and burn faster at high operational loads with higher cylinder pressure and temperature. As a result, the diesel fuel does not have time to sufficiently mix with hydrogen before it ignites as it does at low operational loads.

Figure 7:
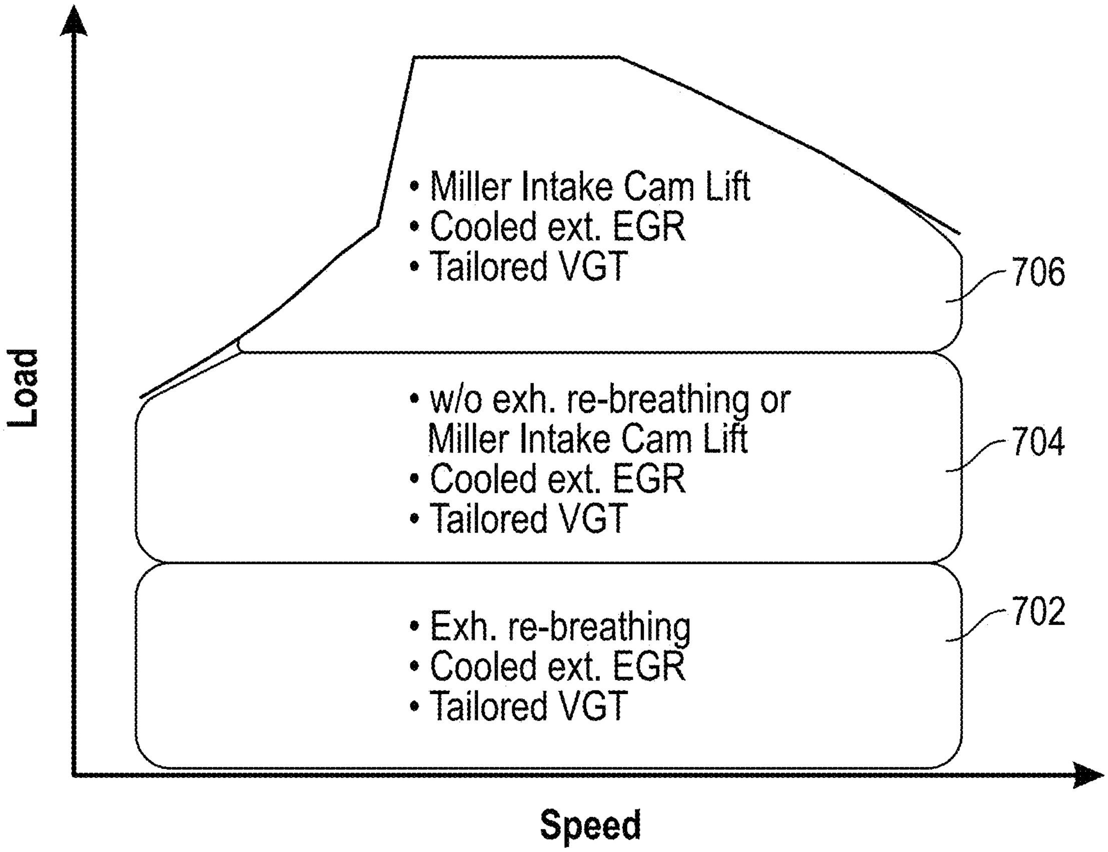
FIG. 7 depicts settings for an air-handling system over various regimes, in accordance with one or more embodiments.

In one aspect, embodiments disclosed herein relate to methods of operating the hydrogen-diesel dual-fuel engine (100). In accordance with one or more embodiments, the operating strategy for the air-handling system of the hydrogen-diesel dual-fuel engine (100) is depicted in FIG. 7. Specifically, FIG. 7 depicts the load-speed space of the hydrogen-diesel dual-fuel engine (100) while operating. The load-speed space of FIG. 7 is partitioned into three regimes. Each regime specifies specific settings for the air-handling system in order to optimize the hydrogen-diesel dual-fuel engine (100). The regimes shown in FIG. 7 are speed-invariant such that the air-handling system settings are altered dependent only on the operational load experienced by the hydrogen-diesel dual-fuel engine (100). As such, the regimes are aptly named the low load regime (702), moderate load regime (704), and high load regime (706). Note that the operational load that indicates a demarcation between the low load regime (702) and moderate load regime (704) and the operational load that indicates a demarcation between the moderate load regime (704) and the high load regime (706) depicted in FIG. 7 are not explicitly specified in FIG. 7. In general, the exact location of the low load regime (702), moderate load regime (704), and high load regime (706) in the load-speed space may be set by a user. Further, in general, the load-speed space of the hydrogen-diesel dual-fuel engine (100) may be partitioned into more or fewer than three regimes.

For each regime (low load (702), moderate load (704), and high load (706)), the exhaust gas recirculation system (126), with exhaust gas recirculation valve (128) and exhaust gas recirculation cooler (130), is used full time to control the charge reactivity. The exhaust gas recirculation system (126) is particularly effective at mitigating pre-ignition and preventing engine knock. By preventing pre-ignition and engine knock, more energy can be extracted from the hydrogen content of the dual fuel. Further, the fuel can be more thoroughly mixed to enhance fuel efficiency.

In the low load regime (702), due to the low autoignition reactivity of hydrogen, exhaust re-breathing is used to increase the charge temperature, thereby enhancing the ignition propensity. In the moderate load regime (704) and the high load regime (706), because the cylinder charge pressure and temperature are sufficiently high, there is no need to use exhaust re-breathing for thermal promotion. Therefore, the exhaust camshaft is switched to the standard lift profile via a two-step mechanism. Further, in the high load regime (706), to maximize the hydrogen energy input and enhance partially-premixed combustion, the charge reactivity must be carefully tailored. This is achieved by implementing a Miller-type LIVC strategy to reduce the effective compression ratio. Lastly, the VGT (108) is developed to adequately meet the thermal boundary conditions requirements (exhaust gas recirculation and boost (air intake)) for each regime (low load (702), moderate load (704), and high load (706)).

Finally, embodiments disclosed herein relate to methods of operating the hydrogen-diesel dual-fuel engine (100) under warm, cold conditions (cold startup), and during a federal test procedure (FTP) cycle (transient operation). In accordance with one or more embodiments, operation of the hydrogen-diesel dual-fuel engine (100) is controlled by the controller upon receiving engine data describing the state of the hydrogen-diesel dual-fuel engine (100) from the plurality of sensors. The high-level operating strategy under warm conditions (800) (e.g., 90° C. coolant and oil temperature) is depicted in FIGS. 8A-8I. Specifically, FIGS. 8A-8I are labelled plots, each depicting a setting, such as a parameter or relative quantity, of the hydrogen-diesel dual-fuel engine (100), as disclosed herein, with respect to the normalized operational load.

Figure 8A:
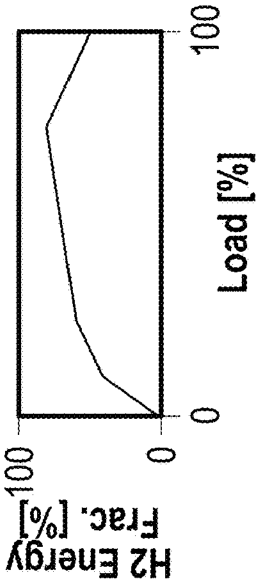
FIGS. 8A-8I each depict a plot that indicates a value or setting of a parameter with respect to operational load, in accordance with one or more embodiments.

At 0% load, the hydrogen-diesel dual-fuel engine (100) is operated with only diesel (i.e., no hydrogen) as seen in FIG. 8A. Further, at 0% operational load, no exhaust gas recirculation (EGR) is used (FIG. 8G). In FIG. 8G, the exhaust gas recirculation is given as a percentage of the volume, or moles, of gas in a cylinder (104) compared to the relative to the total volume, or total moles, of gases in the cylinder (104) after the intake stroke, where the total volume is composed of exhaust products, hydrogen, diesel, and air. Additionally, at 0% operational load, the diesel fuel is injected in a single stage. The percentage of diesel injected into a cylinder (104) during the first injection event compared to the total amount of diesel injected into the cylinder over a cycle of the piston is given as a function of operational load in FIG. 8H. As seen in FIG. 8H, at low loads (near 0%) and at high loads (near 100%), none of the diesel injected into the cylinder (104) comes from the first diesel injection event (404). That is, only a single diesel injection event is used at this operational load.

As seen in FIG. 8A, the hydrogen energy input increases progressively with load and reaches a peak at an operational load near 80%. Then, the hydrogen energy input decreases with additional increases in operational load. Note, the hydrogen energy input fraction refers to the percentage of fuel energy input into the cylinder that comes from hydrogen. FIG. 8D depicts the global equivalence ratio of the hydrogen, diesel, and air mixture. Per convention, an equivalence ratio of one indicates a stoichiometric ratio of fuel (hydrogen and diesel) and air. An equivalence ratio less than one indicates that the hydrogen, diesel, air mixture is fuel lean and an equivalence ratio greater than one indicates that the fuel-air mixture is fuel rich. FIG. 8G, as stated, indicates the proportion of exhaust gases recirculated into a cylinder (104) given as percentage of exhaust gases in the cylinder (104) by volume. The equivalence ratio and the proportion of exhaust gas recirculation (EGR) are carefully designed to deliver 1-2 g/kWh engine-out $NO_x$ and adequate boost (i.e., air intake compression) with low pumping losses over the full operating range of the hydrogen-diesel dual-fuel engine (100). The equivalence ratio decreases as a function of operational load. Further, when transitioning from approximately 30% operational load to full operational load, the EGR gradually decreases.

Figure 8B:
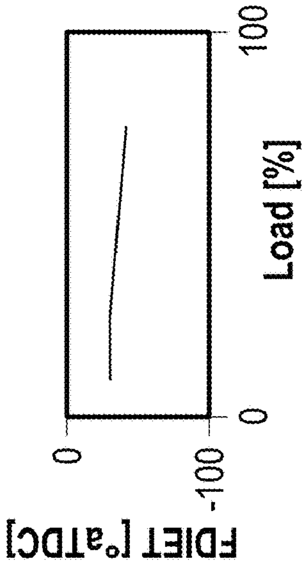
Figure 8C:
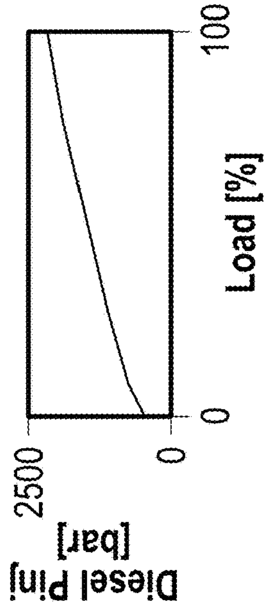
Figure 8D:
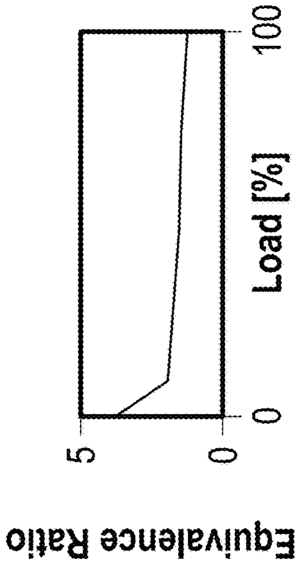
Figure 8E:
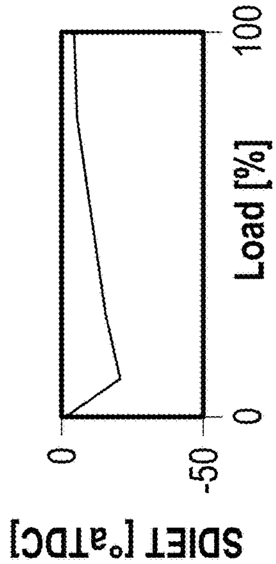
Figure 8F:
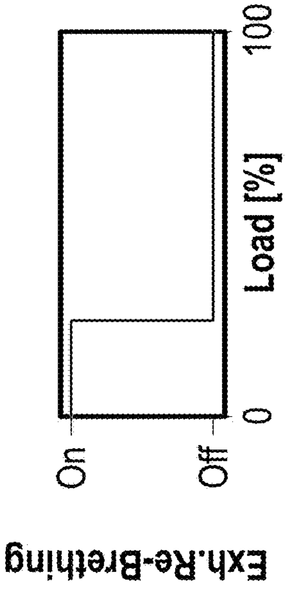
Figure 8G:
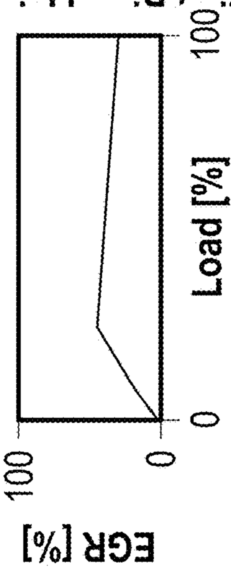
Figure 8H:
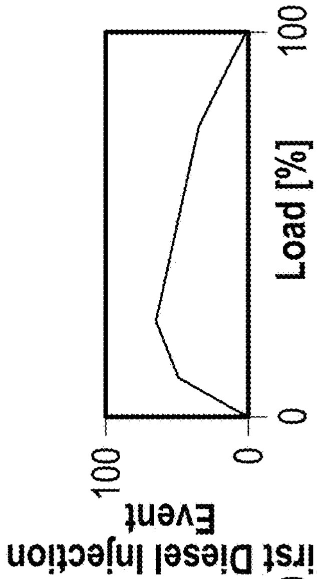

FIGS. 8B and 8E depict the first diesel injection event timing (FDIET) and the second diesel injection event timing (SDIET), respectively. As shown in FIG. 8B, the timing of the first diesel injection event (404) is relatively invariant over a wide range of operational loads, however the timing is sooner (decreasing ° aTDC) with increased operational load. In contrast, the timing of the second diesel injection event (406) is much more complicated and dependent on the operational load, as illustrated in FIG. 8E. At low loads, the SDIET is rapidly advanced from 0° aTDC to approximately −20° aTDC within roughly 15% operational load. As the load increases, the SDIET is gradually retarded and returns to nearly 0° aTDC with a few step changes in the slope of the rate of timing change. As the SDIET is slowly retarded at increasing loads the combustion process is increasingly diffusion driven. Concurrently, and as depicted in FIG. 8C, the diesel fuel injection pressure ($P_{inj}$) steadily increases to attain good air utilization.

As previously discussed with FIG. 7, in the low load regime (702) there is exhaust re-breathing, however, the exhaust re-breathing is turned off when the operational load of the hydrogen-diesel dual-fuel engine (100) is in the moderate load regime (704) and the high load regime (706). The use of exhaust re-breathing only in the low load regime (702) is demonstrated in FIG. 8F. In accordance with one or more embodiments, the operational load at which the state of exhaust re-breathing is switched (i.e., altered from on to off, or from off to on) is specified by a first operational load threshold. The first operational load threshold may be specified by a user and need not align with any demarcation between regimes. That is, the first operational load threshold does not need to equal the operational load that defines the boundary between the low load regime (702) and the moderate load regime (704). In one or more embodiments the first operational load threshold is in the range 25% to 40%.

Figure 8I:
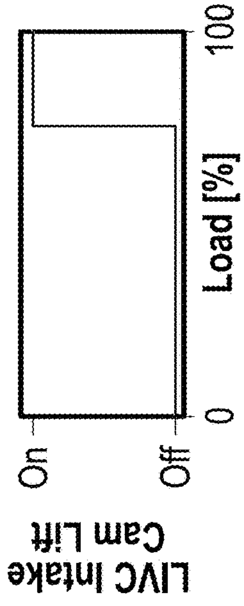

Additionally, in the high load regime (706), to tailor the charge reactivity a Miller-type LIVC strategy is employed to reduce the effective compression ratio. The proper engagement of the cam lift to provide LIVC in the high load regime (706) is shown in FIG. 8I. In accordance with one or more embodiments, the operational load at which the state of LIVC is switched (i.e., altered from on to off, or from off to on) is specified by a second operational load threshold. The second operational load threshold may be specified by a user and need not align with any demarcation between regimes. That is, the second operational load threshold does not need to equal the operational load that defines the boundary between the moderate load regime (704) and the high load regime (706). In one or more embodiments the second operational load threshold is in the range 60% to 80%.

Figure 9:
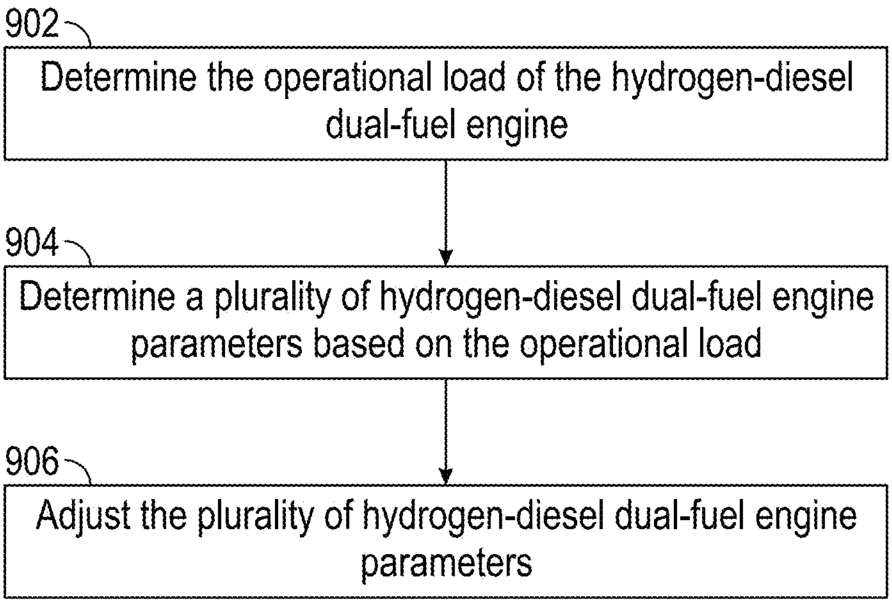
FIG. 9 depicts a flowchart in accordance with one or more embodiments.

In accordance with one or more embodiments, the operating method of the hydrogen-diesel dual-fuel engine (100) under warm conditions is demonstrated as a flowchart in FIG. 9. First, as depicted in Block 902, the operational load of the hydrogen-diesel dual-fuel engine (100) is determined by the controller using measurements from the plurality of sensors disposed on the hydrogen-diesel dual-fuel engine (100). Measurements received from the plurality of sensors by the controller are collectively referred to as engine data. The operational load is determined as a percentage of the max load that can be realized by the hydrogen-diesel dual-fuel engine (100). As previously discussed, there are various settings, parameters and/or quantities, associated with the hydrogen-diesel dual-fuel engine (100). For consistency, the term parameter will be adopted herein. Therefore, it may be said that the operation of the hydrogen-diesel dual-fuel engine (100) is specified by a plurality of hydrogen-diesel dual-fuel engine parameters. In accordance with one or more embodiments, the value of each parameter in the plurality of hydrogen-diesel dual-fuel engine parameters is adjusted by the controller according to the determined operational load, where the operational load is determined by the controller using the engine data. In one or more embodiments, the operating methods of the hydrogen-diesel dual-fuel engine (100) are specified through a series of functional relationships relating the desired value of a parameter with respect to the operational load. FIGS. 8A-8I are each associated with a parameter in the plurality of hydrogen-diesel dual-fuel engine parameters. Therefore, FIGS. 8A-8I depict the functional relationships between the plurality of hydrogen-diesel dual-fuel parameters and the operational load.

Returning to the flowchart of FIG. 9, in Block 904, once the operational load of the hydrogen-diesel dual-fuel engine (100) has been determined, the values of the parameters in the plurality of hydrogen-diesel dual-fuel engine parameters are determined based on the operational load. In other words, the plurality of hydrogen-diesel dual-fuel engine parameters is determined. The plurality of hydrogen-diesel dual-fuel engine parameters includes, but is not limited to: a hydrogen energy parameter; an equivalence ratio parameter; an exhaust gas recirculation parameter; a first diesel injection event timing parameter; a second diesel injection event timing parameter; a first diesel injection quantity parameter; an exhaust re-breathing parameter; and a late intake valve closing parameter. The hydrogen energy parameter corresponds to the amount of energy available to the hydrogen-diesel dual-fuel engine (100) that can be attributed to the hydrogen fuel. The equivalence ratio parameter indicates the equivalence ratio of the hydrogen, diesel, and air mixture. Thus, using the hydrogen energy parameter and the equivalence ratio parameter, the quantity of hydrogen and the quantity of diesel used in a cycle of the hydrogen-diesel dual-fuel engine (100) can be determined.

The exhaust gas recirculation parameter specifies the quantity of exhaust gas present in the combustion chamber relative to the total quantity of contents in the combustion chamber (i.e., the exhaust gas and the reactants (hydrogen, diesel, air)). In other words, the exhaust gas recirculation parameter specifies the quantity of exhaust gas present in the combustion chamber relative to the quantity of exhaust gas and the quantity of reactants.

The first diesel injection timing parameter and the second diesel injection timing parameter simply specify when, in terms of crank angles (i.e., piston position), the first diesel injection event (404) and the second diesel injection event (406) should start, respectively. The first diesel injection quantity parameter indicates how much of the total quantity of diesel will be injected into the cylinder (104) during the first diesel injection event (404). Therefore, the remaining diesel fuel of the quantity of diesel that is not injected into the cylinder (104) during the first diesel injection event (404) is injected into the cylinder (104) during the second diesel injection event (406). Specifically, a first quantity of diesel and a second quantity of diesel may be determined, where the first quantity of diesel is injected into the hydrogen-diesel dual-fuel engine (100) during the first diesel injection event (404) and the second quantity of diesel is injected into the hydrogen-diesel dual-fuel engine (100) during the second diesel injection event (406). The exact values for the first quantity of diesel and the second quantity of diesel can be determined with the knowledge of the total quantity of diesel to be injected and the first diesel injection quantity parameter.

Finally, the exhaust re-breathing parameter and the late intake valve closing parameter simply indicate a Boolean state of "on" or "off." According to the determined operational load, the exhaust re-breathing parameter and the later intake valve closing parameter are determined to be either "on" or "off."

In Block 906, once the plurality of hydrogen-diesel dual-fuel engine parameters have been determined, the parameters in the plurality of hydrogen-diesel dual-fuel engine parameters are adjusted to their appropriate values and/or states.

Figure 10:
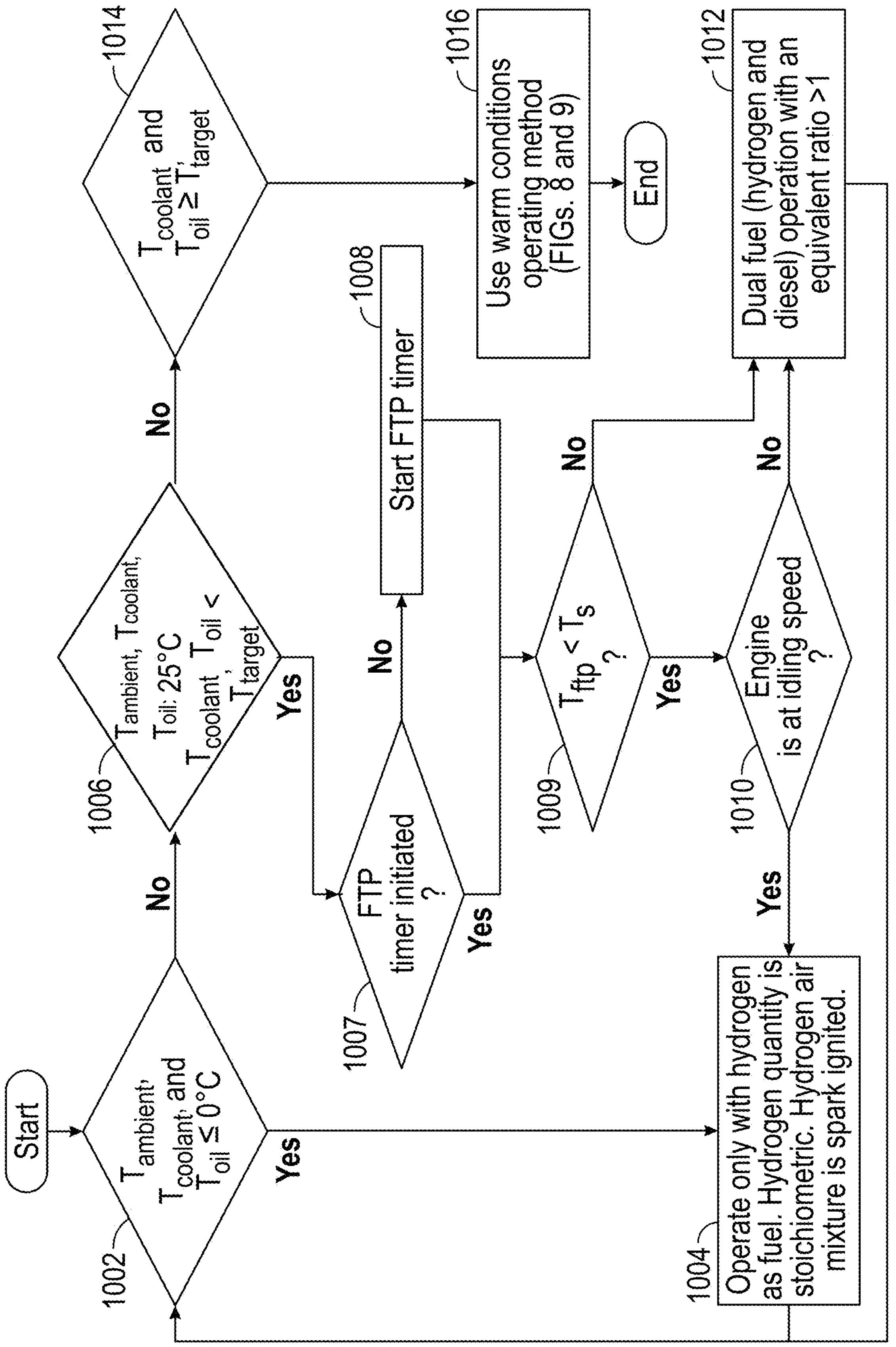
FIG. 10 depicts a flowchart in accordance with one or more embodiments.

The operating methods of the hydrogen-diesel dual-fuel engine (100) in cold conditions (or startup conditions) and during FTP cycle are depicted in FIG. 10. The flowchart of FIG. 10 begins with Block 1002. Block 1002 represents a decision. The decision of Block 1002 is based on the measured ambient temperature ($T_{amb}$) and the temperatures of the coolant temperature ($T_{coolant}$) and oil temperature ($T_{oil}$) in the hydrogen-diesel dual-fuel engine (100). These temperatures are measured, each with one or more thermometers proximate their location. Concretely, the ambient temperature ($T_{amb}$) is measured with one or more thermometers external to the hydrogen-diesel dual-fuel engine (100). The ambient temperature ($T_{amb}$) is the temperature of the environment immediately surrounding the hydrogen-diesel dual-fuel engine (100). Likewise, the coolant temperature ($T_{coolant}$) is measured using one or more thermometers proximate the coolant and the oil temperature ($T_{oil}$) is measured using one or more thermometers proximate the oil of the hydrogen-diesel dual-fuel engine (100). If all of these temperatures are below 0° C., then the hydrogen-diesel dual-fuel engine (100) is said to be in a cold state (or startup state) and the flowchart proceeds to Block 1004. Block 1004 details the operating procedure for the hydrogen-diesel dual-fuel engine (100) in a cold state. While in a cold state, the hydrogen-diesel dual-fuel engine (100) is started and operated through throttled, spark-initiated, stoichiometric (equivalence ratio=1), hydrogen flame propagation. That is, in the cold state, only hydrogen is used as a fuel. The hydrogen is mixed with air in stoichiometric quantities and the hydrogen-air mixture is ignited using the spark ignitor (306).

The ambient temperature ($T_{amb}$), coolant temperature ($T_{coolant}$), and oil temperature ($T_{oil}$) are continually checked. The ambient temperature ($T_{amb}$), which measures the environmental temperature of the hydrogen-diesel dual-fuel engine (100) is not expected to change with engine operation. However, from an initial cold state, coolant temperature ($T_{coolant}$) and oil temperature ($T_{oil}$) are expected to rise from their initial measurements as the hydrogen-diesel dual-fuel engine (100) runs. If all of these temperatures are found to be near (>0° C.) or exceed 25° C. then the hydrogen-diesel dual-fuel engine (100) enters the FTP cycle. Further, as shown in Block 1006, while these temperatures may exceed 25° C., the coolant temperature ($T_{coolant}$) and oil temperature ($T_{oil}$) must be below a predefined target temperature ($T_{target}$), where the target temperature ($T_{target}$) will be described in greater detail below. Note that in some instances the hydrogen-diesel dual-fuel engine (100) does not first enter a cold state. That is, the ambient temperature ($T_{amb}$), coolant temperature ($T_{coolant}$), and oil temperature ($T_{oil}$) may be near 25° C. without first operating the hydrogen-diesel dual-fuel engine (100) according to the cold state operating procedure of Block 1004. For consistency, hereafter, it will be said that when the condition of Block 1006 is met the hydrogen-diesel dual-fuel engine (100) is in an FTP state. If, in Block 1006, the hydrogen-diesel dual-fuel engine (100) is determined to be in the FTP state, the presence of an FTP timer is checked in Block 1007. The FTP timer simply counts the time since the FTP cycle was first started ($t_{ftp}$), or since the hydrogen-diesel dual-fuel engine (100) entered the FTP state. If the hydrogen-diesel dual-fuel engine (100) is entering the FTP state for the first time since startup, then no FTP timer is present. In this case, Block 1007 proceeds to Block 1008 and an FTP timer is started. Once an FTP timer is started, or if one is already found to exist, then the FTP time ($t_{ftp}$) is compared to a threshold time ($t_s$). In one or more embodiments, the threshold time is set to 370 seconds which corresponds to the first third of a standard FTP cycle.

To meet the ultra-low tailpipe $NO_x$ standard over emissions certification cycles, one critical technical area is to achieve fast catalyst heating during the cold FTP cycle. Furthermore, it is particularly important to warm up the catalyst during the first third of the FTP cycle where, during this period, the engine idles appreciably. If, in Block 1009, it is determined that the hydrogen-diesel dual-fuel engine (100) is still in the first portion of the FTP cycle as determined by the threshold time ($t_s$) (e.g., threshold time ($t_s$)=(FTP Cycle Time/3)), then the idling speed is checked in Block 1010. If the hydrogen-diesel dual-fuel engine (100) is in the FTP state and the FTP time ($t_{ftp}$) is less than threshold time ($t_s$) and the engine is at idling speed, then the engine operation proceeds as if the engine were in the cold state (Block 1004). It is beneficial to remain operating according to the cold state to harness the high flame speed of hydrogen and offer superior catalyst light-off performance as compared to conventional, lean, diesel compression ignition.

If either the FTP time ($t_{ftp}$) exceeds the threshold time ($t_s$) or if the engine speed is greater than the idling speed, the hydrogen-diesel dual-fuel engine (100) is switched to a dual-fuel operation, as depicted in Block 1012. As the name implies, under dual-fuel operation, the hydrogen-diesel dual-fuel engine (100) receives both hydrogen and diesel fuel. In this state, the hydrogen-diesel dual-fuel engine (100) is configured to run fuel-rich.

Again, the ambient temperature ($T_{amb}$), coolant temperature ($T_{coolant}$), and oil temperature ($T_{oil}$) are continually monitored. The coolant temperature ($T_{coolant}$) and oil temperature ($T_{oil}$) are compared to a predefined target temperature ($T_{target}$) in Block 1006. In one or more embodiments, the target temperature ($T_{target}$) is 90° C. If both of these temperatures are found to be equal or greater to the target temperature ($T_{target}$), as identified by Block 1014, then the hydrogen-diesel dual-fuel engine (100) is considered to be in a warm state. Note that the ambient temperature ($T_{amb}$) has no bearing on determining whether the hydrogen-diesel dual-fuel engine (100) is in a warm state. While in a warm state, the hydrogen-diesel dual-fuel engine (100) operates using the previously described warm operation method, as shown in Block 1016. Once the hydrogen-diesel dual-fuel engine (100) is in the warm state, the warm operating method (see FIGS. 8 and 9) is used until the hydrogen-diesel dual-fuel engine (100) is shutoff.

Embodiments of the present disclosure may provide at least one of the following advantages. The hydrogen-diesel dual-fuel engine (100) and the operating methods described herein provide for engine performance enhancements by drastically increasing duel-fuel operating range, lowering combustion losses, improving fuel efficiency, and reducing pollutants. The desired effects are achieved, at least in part, through a combustion chamber design and fuel injection strategy that minimizes squish, promotes fuel reactivity in the cylinder (104) central region (318), enhances geometry-guided reactivity distribution, preserves reactivity stratification, and reduces in-cylinder heat transfer losses by eliminating swirl motion. Further, by using exhaust re-breathing to enhance charge temperature at low loads and LIVC at high loads to reduce the effective compression ratio, the hydrogen energy input is maximized, partially-premixed combustion is promoted, and combustion losses are reduced. Moreover, the tailored VGT (108) and exhaust gas recirculation system (126) are configured to effectively control the charge reactivity, delivering 1-2 g/kWh engine-out $NO_x$ (or less), while providing sufficient boost with low pumping losses. Finally, operating methods are provided detailing a full-range fuel injection strategy and air-handling system during warm conditions as well as operating instructions using spark-initiated, stoichiometric, hydrogen flame propagation to enhance cold start and catalyst heating performance under cold and FTP conditions.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method of operating a hydrogen-diesel dual-fuel engine, comprising:

determining an ambient temperature, wherein the ambient temperature is the temperature of an environment surrounding the hydrogen-diesel dual-fuel engine;

determining a coolant temperature, wherein the coolant temperature is the temperature of a coolant in the hydrogen-diesel dual-fuel engine;

determining an oil temperature, wherein the oil temperature is the temperature of an oil in the hydrogen-diesel dual-fuel engine;

receiving, with a controller configured to operate the hydrogen-diesel dual-fuel engine, a target temperature;

using the controller to determine, based on the ambient temperature, coolant temperature, oil temperature, and the target temperature, a state of the hydrogen-diesel dual-fuel engine; and using the controller to operate the hydrogen-diesel dual-fuel engine according to an operation method, based on, the state of the hydrogen-diesel dual-fuel engine.

2. The method of claim 1, wherein the state of the hydrogen-diesel dual-fuel engine is one of: cold state, Federal Test Procedure (FTP) state, and warm state.

3. The method of claim 1, wherein the ambient temperature is measured using at least one thermometer external to the hydrogen-diesel dual-fuel engine, wherein the coolant temperature is measured using at least one thermometer proximate the coolant, and wherein the oil temperature is measured using at least one thermometer proximate the oil.

4. The method of claim 2, wherein, when the hydrogen-diesel dual-fuel engine is determined to be in the FTP state, the method further comprises:

determining if a FTP timer has been initiated;

starting the FTP timer, wherein the FTP timer counts a FTP time since the FTP timer was started;

comparing the FTP time to a threshold time; and determining an engine speed of the hydrogen-diesel dual-fuel engine.

5. The method of claim 2, wherein, when the hydrogen-diesel dual-fuel engine is determined to be in the cold state, the hydrogen-diesel dual fuel engine uses a stoichiometric mixture of hydrogen and air as a fuel.

6. The method of claim 4, wherein, when the hydrogen-diesel dual-fuel engine is determined to be in the FTP state and when the FTP time is greater than the threshold time or when the engine speed of the hydrogen-diesel dual-fuel engine is greater than an idling speed, the hydrogen-diesel dual-fuel engine uses a fuel-rich mixture of air, hydrogen, and diesel.

7. The method of claim 2, wherein when the hydrogen-diesel dual-fuel engine is determined to be in the warm state, operating the hydrogen-diesel dual-fuel engine according to a warm conditions operating method.

8. The method of claim 2, wherein the state of the hydrogen-diesel dual-fuel engine is the warm state when the coolant temperature and the oil temperature are greater than or equal to the target temperature.

9. The method of claim 2, wherein the state of the hydrogen-diesel dual-fuel engine is in the cold state when the coolant temperature and the oil temperature are less than or equal to zero degrees Celsius.

10. The method of claim 2, wherein the state of the hydrogen-diesel dual-fuel engine is in the FTP state when the coolant temperature and oil temperature are greater than zero degrees Celsius and less than the target temperature.

11. The method of claim 4, wherein, when the hydrogen-diesel dual-fuel engine is determined to be in the FTP state and when the FTP time is less than the threshold time and when the engine speed of the hydrogen-diesel dual-fuel engine is at idling speed, the hydrogen-diesel dual fuel engine uses a stoichiometric mixture of hydrogen and air as a fuel.

12. A method of operating a hydrogen-diesel dual-fuel engine, comprising:

sending temperature data from sensors on the hydrogen-diesel dual-fuel engine to a controller, the temperature data comprising:

an ambient temperature, wherein the ambient temperature is the temperature of an environment surrounding the hydrogen-diesel dual-fuel engine;

a coolant temperature, wherein the coolant temperature is the temperature of a coolant in the hydrogen-diesel dual-fuel engine;

an oil temperature, wherein the oil temperature is the temperature of an oil in the hydrogen-diesel dual-fuel engine;

using the controller to determine a state of the hydrogen-diesel dual-fuel engine based on the temperature data; and using the controller to operate the hydrogen-diesel dual-fuel engine according to an operation method associated with the state of the hydrogen-diesel dual-fuel engine.

13. The method of claim 12, wherein the sensors comprise at least one temperature sensor.

14. The method of claim 13, where in the sensors further comprise a tachometer.

15. The method of claim 12, wherein the state of the hydrogen-diesel dual-fuel engine is determined by determining whether the coolant temperature and the oil temperature are within a predefined range.

16. The method of claim 12, wherein the state of the hydrogen-diesel dual-fuel engine is one of: cold state, Federal Test Procedure (FTP) state, and warm state.

17. The method of claim 12, further comprising using the controller to determine an engine speed of the hydrogen-diesel dual-fuel engine.

18. The method of claim 17, the method further comprising determining whether an FTP timer is initiated and comparing the FTP timer to a threshold in response to the determination that the FTP timer is initiated.

19. The method of claim 18, wherein the operation method is further based on one or more of a comparison of the engine speed to an idling speed and the comparison of FTP timer to the threshold.

20. The method of claim 12, wherein the operation method associated with the state of the hydrogen-diesel dual-fuel engine comprises a composition of fuel.

21. The method of claim 20, wherein the composition of fuel of the operation method associated with the cold state is a stoichiometric mixture of hydrogen and air.

* * * * *